Dec. 18, 1923. Re. 15,734

A. H. PITNEY

POSTAGE METER AND MAIL MARKING MACHINE

Original Filed March 25, 1920 5 Sheets-Sheet 1

Inventor:

Arthur H. Pitney

By Alexander & Fowell

Attorneys.

Dec. 18, 1923. Re. 15,734

A. H. PITNEY

POSTAGE METER AND MAIL MARKING MACHINE

Original Filed March 25, 1920 5 Sheets-Sheet 2

Inventor
Arthur H. Pitney
By Alexander & Sawall
Attorneys

Dec. 18, 1923. Re. 15,734
A. H. PITNEY
POSTAGE METER AND MAIL MARKING MACHINE
Original Filed March 25, 1920 5 Sheets-Sheet 3
Fig. 3.
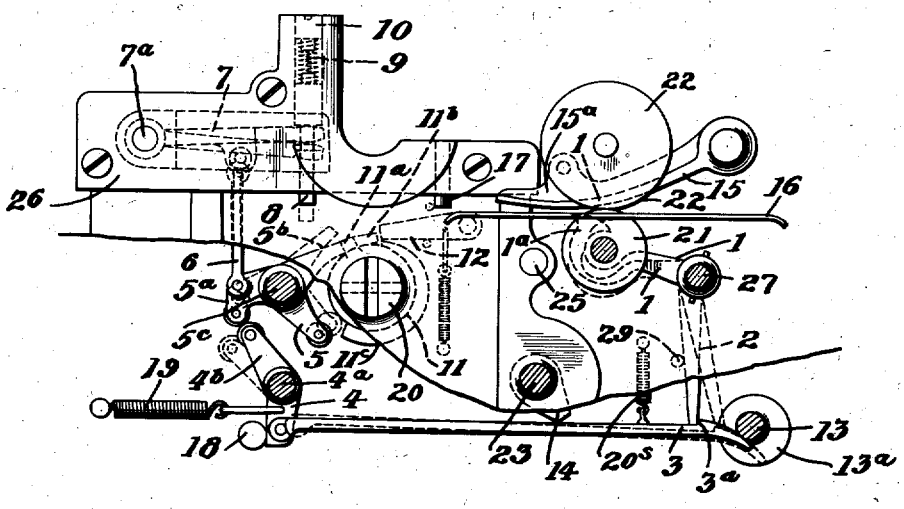
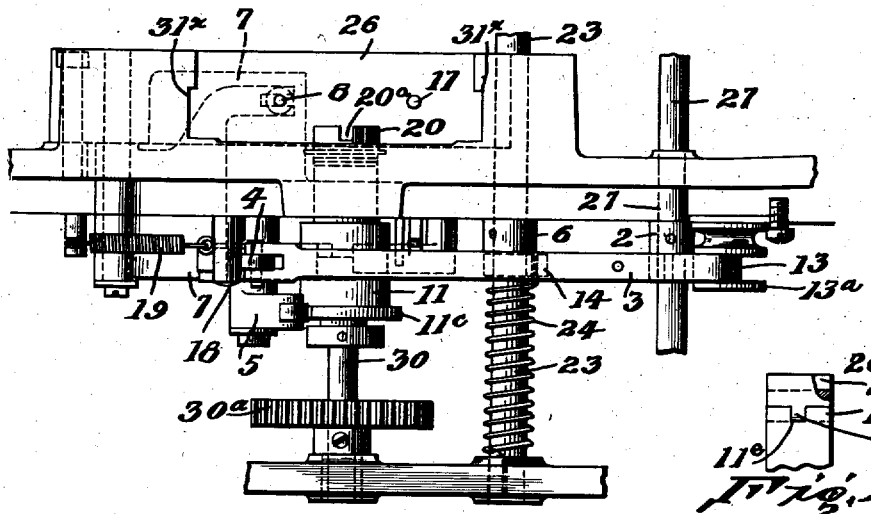
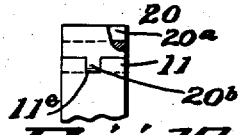
Fig. 14.
Fig. 4.
Inventor
Arthur H. Pitney
By
Alexander Powell
Attorneys Dec. 18, 1923. Re. 15,734

A. H. PITNEY

POSTAGE METER AND MAIL MARKING MACHINE

Original Filed March 25, 1920 5 Sheets-Sheet 4

Inventor

Arthur H. Pitney

By

Alexander & Dowell

Attorneys

Dec. 18, 1923. Re. 15,734

A. H. PITNEY

POSTAGE METER AND MAIL MARKING MACHINE

Original Filed March 25, 1920 5 Sheets-Sheet 5

Inventor

Arthur H. Pitney

By Alexander & Farrell

Attorneys

Reissued Dec. 18, 1923.

Re. 15,734

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

POSTAGE METER AND MAIL-MARKING MACHINE.

Original No. 1,370,668, dated March 8, 1921, Serial No. 368,701, filed March 25, 1920. Application for reissue filed January 8, 1923. Serial No. 611,507.

*To all whom it may concern:*

Be it known that I, ARTHUR H. PITNEY, a citizen of the United States, residing at Stamford, county of Fairfield, and State of Connecticut, have invented certain new and useful Improvements in Postage Meter and Mail-Marking Machines; and I hereby declare that the following is a full, clear, and exact description thereof, reference being had to the accompanying drawings, which form part of this specification.

This invention relates to mail marking machines and postage meters, for impressing stamps upon envelopes, cards, or the like of the type shown and described in my Patents No. 753,207, dated February 23, 1904, and No. 1,273,793, dated July 23, 1918.

The objects of the present invention are:—To improve the type of machine shown in the latter patent so that the printing member will be outside of the casing and always readily accessible for inspection, and at the same time be inseparably operatively connected with the registering mechanisms. To dispense with shifting printing or serial numbering wheels on the printing member. To provide novel means whereby each effective operation of the printing member shall be accurately registered. To provide means whereby when the printing mechanism has made a predetermined number of operations the related registering mechanism will be automatically locked and remain locked until such registering mechanism is reset by the proper authorized party. To provide novel total registering mechanism whereby the total number of actual stamped impressions made by the printing member will be recorded. To have the registering and the printing mechanisms readily bodily removable from and replaceable in the machine without the use of an auxiliary housing, such as is employed in my last mentioned patent. To provide novel simple means for actuating the registering mechanisms from and by the rotation of the printing member. To provide novel means for locking the printing member against rotation when it is removed from the machine. To provide novel means whereby the registering mechanisms will be locked when they are removed from the machine; so that such mechanisms cannot be improperly shifted or changed. To provide novel means whereby when the case containing the registering mechanisms and carrying the printing member is properly positioned in the machine the registering and printing mechanisms are automatically rendered operable. To provide means whereby when such case is removed from the machine the printing member and the registering mechanisms are automatically locked. To provide novel means for preventing the operation of the printing member unless and until the inking member therefor is in proper operative position; and to enable the printing and registering mechanisms to be made smaller and lighter and enhance speed and lessen shock.

The foregoing and other minor objects of the invention are attained by and in the mechanism shown in the accompanying drawings, which illustrate one practical embodiment of the invention, and I will hereinafter describe the same in detail with reference to said drawings; but the invention is not restricted to the specific constructions and combinations of parts shown although the machine illustrated is the best practical embodiment of the invention now known to me; but its parts are or may be capable of variation in form and arrangement and combination within the scope of this invention as set forth in the claims following the detailed description of such drawings.

In said drawings;

Figure 3 is an enlarged detail sectional plan of the trip mechanism.

Figure 4 is a side view of Fig. 3.

Figure 14 is a detail.

*General description.*

Figure 1:
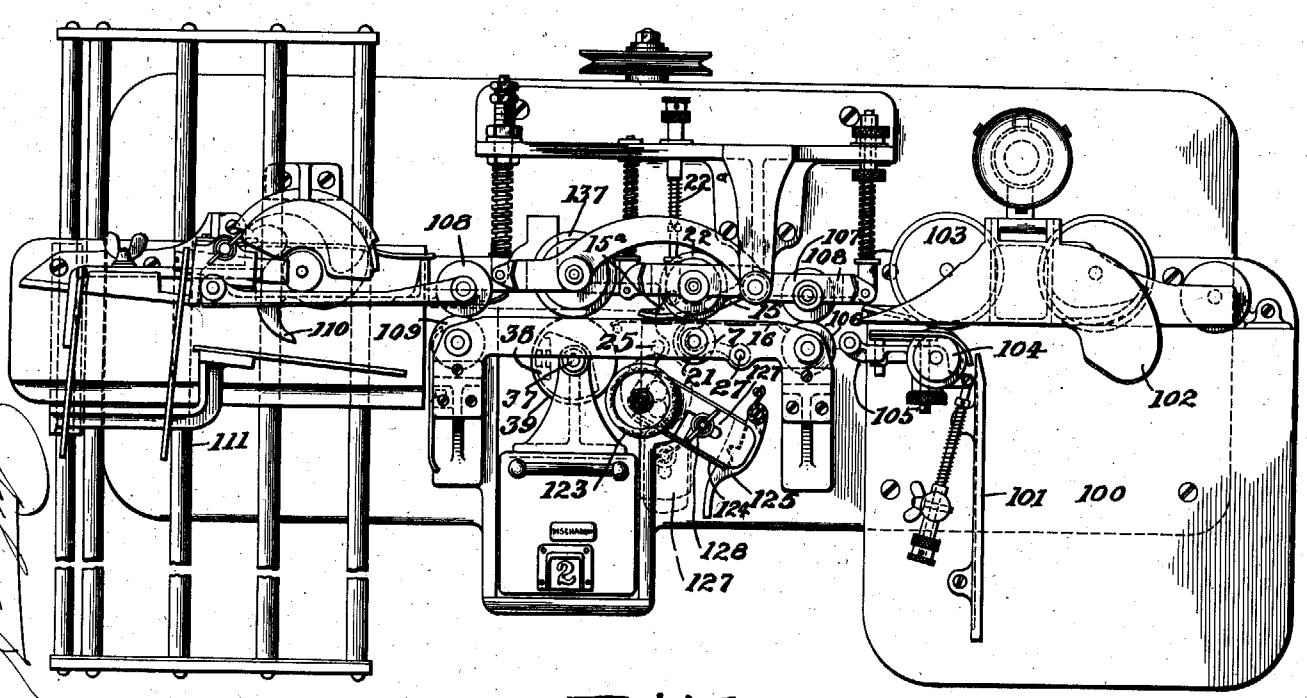
Figure 1 is a plan view of the machine.

The machine shown in the drawings comprises a feed table 100 having a guide plate 101 and an envelope sealing attachment 102; a feed roller 103, a separator roller 104, which is mounted in a swingable support 105 by which the letters are advanced to forwarding rollers 106 and 107 the latter forwarding roller being mounted on a swingable support 108; and these forwarding rollers 106, 107 direct the letter or object to be printed to and past trip rollers 21, 22, hereinafter referred to, by which the letters are directed on past the impression roller 137 and printing roller 38, hereinafter referred to, and after being postmarked or stamped the letters are discharged between rollers 108 and 109 in front of the stacker wheel 110, by which they are stacked in the usual manner on a table or rack 111.

The aforesaid parts are all actuated in proper time, with the mechanism hereinafter to be described but as they form no essential part of the present invention and are not claimed herein, therefore I have not explained or illustrated the same in detail herein.

Hereinafter for the purpose of brevity I will refer to the object to be operated upon as a "letter" meaning thereby to include cards, sheets, papers, and any other object which the machine is designed or adapted to operate upon.

The particular invention covered by the present application includes means for printing or applying the postmarking stamps on the letters, and to a meter or mechanism for registering the number of effective operations of said printing or postmarking means; including a subtracting or limiting register; a total register, and the controlling devices therefor, and means for controlling the operation of the printer by the letters being operated upon so that the printer and meter will only operate when a letter is passing through the machine, and will only operate once for each letter passed through the machine.

*The trip mechanism.*

Referring more particularly to Figs. 1, 3 and 4; 21 and 22 are a pair of rollers commonly called trip rollers, between which the letters are successively passed from the feed table. The trip roller 22 is preferably journaled on a swingable support and guard 15, which has a part $15^a$ which projects beyond the roller 22, and these parts are normally yieldingly pressed toward the roller 21 by a suitable spring, such as indicated at $22^a$ in Fig. 1.

The shaft of the roller 21 is mounted in fixed bearings opposite the roller 22 and guard 15, and a fence or guide 16 is arranged beside and between the rollers 21 and 22, beside the guard 15, and is slotted to accommodate the rollers 21 and 22 so as not to interfere with their contact with the letter passing between them.

A trip finger 1 is pivoted on a spindle 27 and has a curved head or end $1^a$ which projects in the path of the letter at the meeting line of the rollers 21 and 22 so that a letter passing between these rollers, or between the fence 16 and guard 15 will strike this trip finger and will oscillate spindle 27. To spindle 27 is pinned an arm 2 and the trip finger and arm 2 oscillate or move as one piece. The trip finger is normally held in letter engaging position by a suitable spring, such as indicated at 28, arm 2 being arrested by abutting against a stop pin 29 when the trip finger is in normal position.

The arm 2 is adapted to engage the curved and notched end $3^a$ of a trip link 3; the said curved end being supported and guided in a grooved member 13 having upper and lower disk like portions $13^a$ which guide the end of the link 3. The two disk-like portions prevent perpendicular movement of link 3, and the center portion of the member 13 when engaged by the curved end of the link 3 forces it out of engagement with the arm 2 at the proper time. Member 13 is made eccentric in order to admit of ready adjustment thereof to operate the trip at the proper time. The trip link is normally held in position to engage the arm 2 and the shank of the member 13 by a spring $20^s$ as indicated in the drawings.

The other end of trip link 3 is pivoted to one arm 4 of a stop lever which is pivoted on a stud $4^a$, and which arm 4 is normally held against a stop 18 by means of a spring 19, that thus holds the trip link normally retracted.

The stop lever 4 (see Fig. 3) has an arm $4^b$ which normally projects into the path of an arm $5^a$ of a three-armed lever pivoted on a stud $5^c$; and when in normal position a roller on the arm $5^a$ contacts with a roller on the arm $4^b$ and arrests the movement of the arm $5^a$, which is normally pressed toward the arm $4^b$ by means of a link 6 under action of a spring 9. The link 6 connects arm $5^a$ with a swinging lever 7 pivoted on a stud on a part 26 of the frame of the machine; and the upper free end of this lever is slotted for engagement with a pin 8, guided in a hole in part 26; pin 8 is normally urged to project from the face of part 26 by an expansion spring 9. Pin 8 is restrained from so projecting under operating conditions by the correct functioning of the other parts of the trip mechanism in one event when the meter is in place and properly functioning; and by having the path of its motion obstructed by devices controlled by the locking mechanism of the meter, as hereinafter described, when the registering mechanism is locked. The pin 8 is so positioned that it will enter a hole 58 in the front of the meter casing 31 when the latter is in proper position in the machine, as hereinafter explained.

The triple lever, of which arm $5^a$ forms a part, has an arm $5^b$ which normally projects into the path of the finger $11^a$ of the clutch release member of a clutch 11 mounted on a shaft 30, which shaft is constantly driven by a gear $30^a$ fixed thereon and meshing with the usual train of gearing in the machine, so as to be constantly rotated when the machine is in operation; such gearing being well known and it is not necessary to show or describe same herein.

The clutch 11 is preferably a so-called "roller clutch," of known construction and unnecessary to describe herein except in its particular relation to the working of this machine; the finger $11^a$ of the clutch release member protrudes from the body of the clutch in position to be engaged by arm $5^b$. A stop $11^b$ on the clutch casing is also adapted to engage arm $5^b$ and take up the shock of the stoppage of the clutch and parts affected thereby.

The clutch 11 is normally disengaged from the shaft 30 by contact of its controlling finger $11^a$ with the arm $5^b$, and the tripple lever is held in this engaging position so long as arm $4^b$ arrests the movement of arm $5^a$. When the part $11^a$ is moved back toward $11^b$ it renders the clutch inoperative. The lug $11^b$ relieves the comparatively light piece $11^a$ from every other duty except releasing the clutch rollers.

The tripple lever having arms $5^a$, $5^b$, also has an arm 5 carrying a roller adapted to engage a cam $11^c$, turned on the clutch case; which cam engages the arm 5 and returns the lever to its original position to stop the clutch after it has completed one revolution. Rebound of the clutch and parts connected therewith is prevented by a pawl 12.

*The meter or registering devices.*

The meter for registering the operations of the printer comprises a hollow base 31 having bearings for the printer shaft; a casing 34 fastened to this base carrying the registering mechanisms and locking devices therefor, and a printer and register actuating devices and locking devices, the whole being so constructed that the printer and the registering mechanisms are removable from and replaceable in the machine as a unit.

Figure 6:
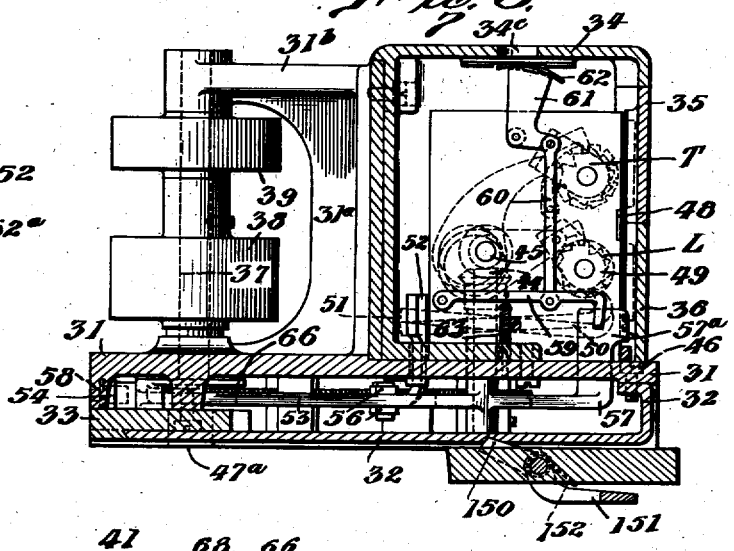
Figure 6 is a vertical sectional view on the line 6—6 Fig. 5.

As shown the base 31 is closed by a plate 32 held in position by screw 46, Fig. 6, which is inaccessible when the door is closed and locked. The screws fastening bar 33 to the base 31 are covered by plate 32 and are also inaccessible until it is removed.

Figure 7:
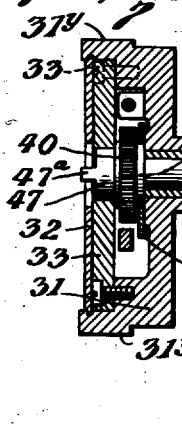
Figure 7 is a sectional view on the line 7—7 Fig. 5.

Rising from the inner end of base 31 is a standard $31^a$ which has an arm $31^b$ at its upper end in which is journaled the upper end of a spindle 37, the lower end of which is journaled in bearings in the bar 33. Spindle 37 carries the printer 38 and letter guide wheel 39. The spindle 37 has on its lower end a cylindric head 47 (Fig. 7) which is provided with a key $47^a$. This head also carries a gear 40 within the base, and a disk $40^b$ having a single notch $40^c$, which is adapted to be engaged by a tooth $66^a$ on a lever 66, hereinafter referred to (see Fig. 11).

The key $47^a$ of the head is disposed diametrically of spindle 37 and projects through an opening in the base plate 32 and is adapted to engage a correspondingly slotted member 20 attached to the clutch 11, when the meter is in position on the machine.

Part 20, (Figs. 4 and 14) is a "floating" connection between the clutch 11 and spindle 37. It has a slot $20^a$ in the top and a key $20^b$ on its bottom arranged at right angles to each other; which respectively engage a key and a slot on the ends of the spindle 37 and clutch 11, while permitting of a slight variation in the alinement of the spindles 30 and 37.

Figure 2:
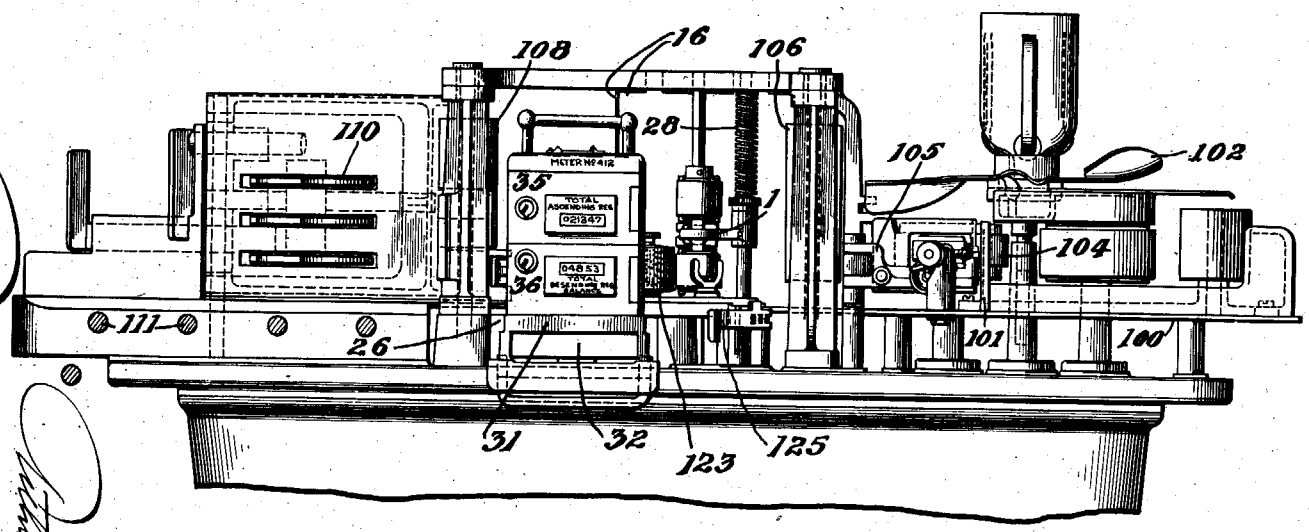
Figure 2 is a front elevation with stacker and stacker slide omitted.

As shown the top plate of the machine is provided with a horizontally disposed slot into which the base 31 can be slid to place the meter in the position indicated in Figs. 1 and 2, the slot having grooves $31^x$ (Fig. 4) in its sides adapted to be engaged by ribs $31^y$ on the sides of the base 31 (see Fig. 7), and when properly placed in operative position in the machine the meter may be secured by means of a lever (Fig. 6) having a tooth 150 adapted to engage a notch in the bottom plate 32 and provided with a finger portion 151 whereby the tooth may be disengaged from the base when it is desired to remove the meter; and this catch may be normally held in engagement by a spring 152 of any suitable kind.

When the meter is slid into place in the machine the key $47^a$ is arranged parallel with the longitudinal axis of the base 31, and is adapted to telescope with and enter the slot $20^a$ in the upper end of the member 20.

*The printing member.*

The printing member or "printer" 38 may be of any suitable kind. For the purpose of postmark-stamping letters it should be provided with suitable dies for printing the stamp upon the letter, and may be provided with canceling lines if desired. The postmark-stamp die may be such, for example as shown in my patents above referred to, or my Patent No. 753,207; or in Patents No. 1,274,831 and No. 1,273,793. The printing surface may be of any suitable or desirable kind, but in the present instance I do not wish to provide the printer with serial numbering mechanism, although such might be used if desired.

Inseparably fixed to and mounted upon the base 31 at the outer side of the standard 31[a] is a box or case 34 having upper and lower hinged doors 35 and 36 on its outer side and which case incloses the counting or registering mechanism of the meter. Each door 35 and 36 should be provided with a suitable lock, such as a Yale lock, so that it could only be opened by a certain master key.

Mounted within this case 34 is a horizontally disposed shaft 45 having a bevel pinion 45[a] meshing with a bevel pinion 44[a] on the upper end of a shaft 44 (see Fig. 10), which is suitably journaled in the case and extends into the base 31. Motion is imparted to the spindle 44 from the shaft 37 by means of intermediate pinions 41 and 42 respectively meshing with pinion 40 on spindle 37, and pinion 43 on spindle 44. This gearing is adapted to drive shaft 45 at the same speed as spindle 37.

*The registering mechanisms.*

Mounted within the case are two separate registering mechanisms, T and L, which may be of any suitable construction. As shown each mechanism comprises a series of usual numeral disks provided with the usual ratchet and carry over devices (not shown). The upper mechanism T is adapted to be operated from shaft 45 by means of a link 45[c] engaging an eccentric 45[d] on the shaft 45; and the lower mechanism L is suitably operated by means of a link 45[b], engaging an eccentric 45[e] on the shaft 45. The registering mechanisms per se form no part of the present invention, and therefore it is not necessary to describe the same in detail herein. The construction is such that for each rotation of the spindle 37 shafts 44 and 45 will be rotated once, and the unit numeral wheel in each registering mechanism T and L will be shifted one point.

The registering mechanisms T and L are separated by a partition 48 in case 34 so placed that when either door 35 or 36 is opened to give access to the adjacent registering mechanism, the other mechanism is inaccessible, each registering mechanism is only accessible through its related door.

The lower register is arranged to subtract instead of add, that is, the registry is suitably set to a predetermined number, and at each revolution of the printer 38, and consequently each revolution of shaft 45, the number appearing on register mechanism L will be diminished by one, until the register L finally shows zero; when, as will be hereinafter described, the whole register mechanism and the printer is automatically locked against further operation.

Each numeral wheel 49[a] of the lower registering mechanism L has a disk 49 fastened to and revolving therewith; such disk 49 has a single peripheral notch therein and is so positioned that the notch will be in position to receive a projection 50[a] on a locking plate 50, when "zero" on the related numeral wheel 49[a] appears opposite the sight aperture in door 36.

Figure 9:
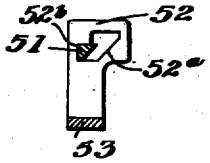
Figure 9 is a detail.
Figure 8:
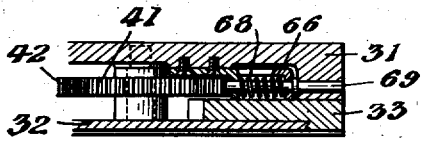
Figure 8 is a section on the line 8—8 Fig. 5.
Figure 12:
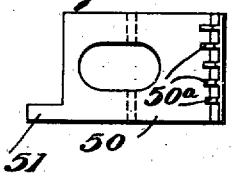
Figures 12 and 13 are detail top and front edge views of the registering mechanism locking plate.
Figure 13:
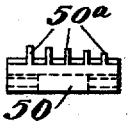

A locking plate 50 is pivoted at 50[b] (Fig. 10) below the registering mechanism. The plate 50 has projections 50[a], Fig. 11, on its front end adapted to engage the notches in the disks 49[a]. It also has a rear end projection or finger 51 that engages an opening (Fig. 9) in the end 52 of a lever 53 hereinafter referred to. The plate 50 may be engaged by a spring as at 50[z], which normally urges its front end up to engage projections 50[a] with the slots in the disks 49 and consequently lower finger 51.

A lever 53 is pivoted at 53[a] in the base 31 so as to swing horizontally, and this lever has its forward end upturned as at 52, (Figs. 5, 6, 9, 10, 11) and this upturned end projects into the path of the finger 51 of the locking plate 50, and has a slot provided with an inclined portion 52[a] (Fig. 9) adapted to engage the correspondingly beveled side of the finger 51. The opposite side of the slot in end 52 is provided with a notch 52[b] adapted, in one position of the lever 53, to be engaged by the finger 51 to hold the locking plate in engagement with the locking disks 49 as hereinafter described.

Figure 11:
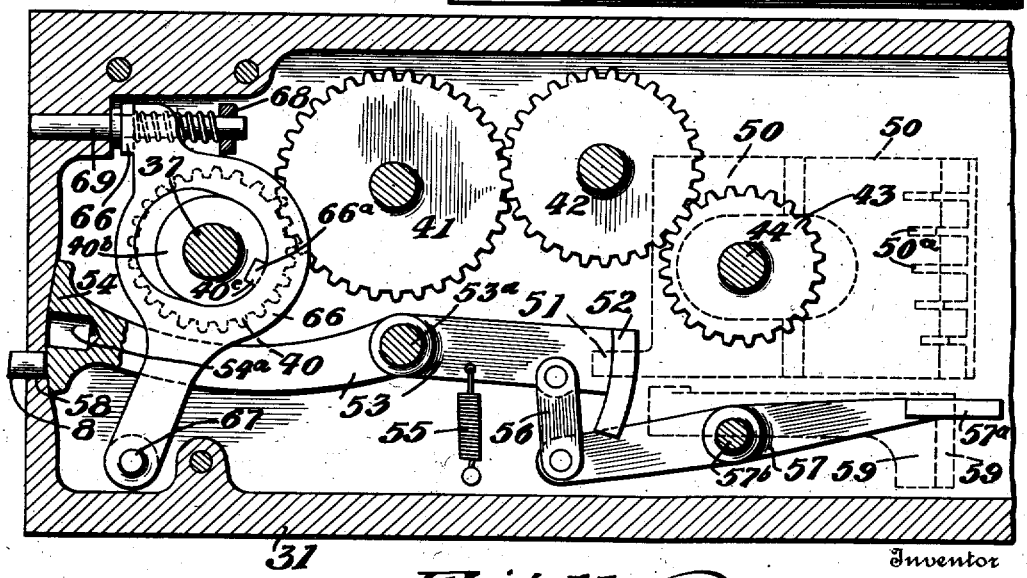
Figure 11 is an enlarged detail horizontal sectional view.

The inner end of the lever 53 has a segmental head 54, Fig. 11, which is adapted to close an opening 58 in the inner end of the base 31, when the locking plate 50 has locked the registering wheels. This head 54 is provided with a socket 54[a] which is adapted to register with the hole 58 when the locking plate 50 is released, as hereinafter explained. The lever 53 is engaged by a spring 55, which tends to hold it in the position shown in Figs. 5 and 11, when the plate 50 has locked the register L.

Figure 5:
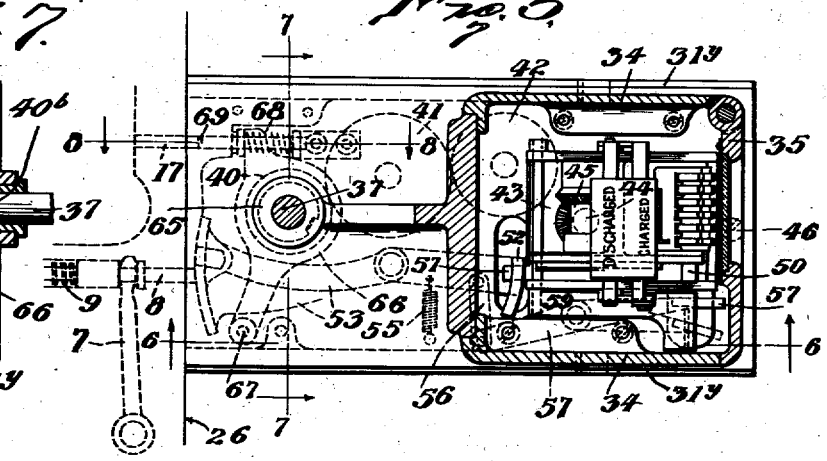
Figure 5 is an enlarged part sectional plan view of the meter and controlling devices.
Figure 10:
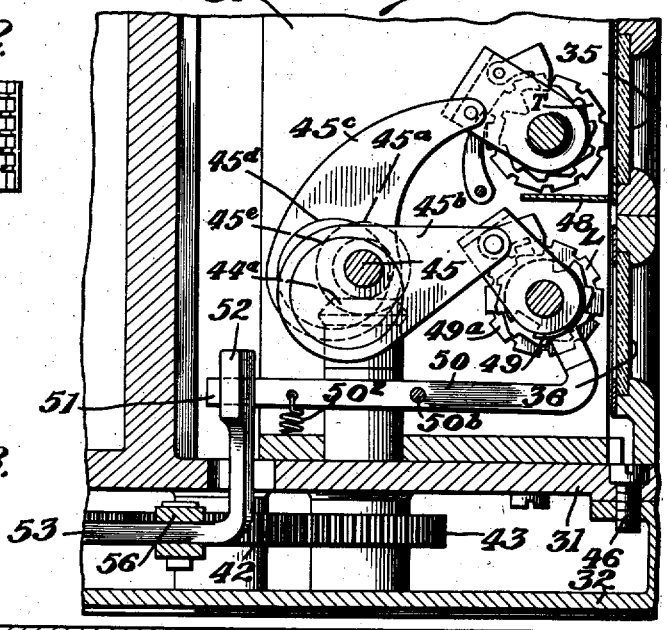
Figure 10 is an enlarged sectional view through the registering mechanism showing the registering disk actuating and locking mechanisms.

When the lower registering mechanism L is locked by the plate 50 and the parts are in position as shown in Figs. 5, 10 and 11, the registering mechanism cannot be shifted; nor can the lever 53 and locking plate 50 be released until and unless the door 36 is opened to permit access to a resetting lever 57. This resetting lever is pivoted at $57^b$ in the base 31, and its inner end is connected by a link 56 with the adjacent end of the lever 53. Said lever 57 has an upstanding portion $57^a$ on its front end which extends into the case 34 in position to be engaged by the finger of the operator when the door 36 is opened. This lever 57 can only be reached when door 36 is opened. The lever 57 is only used to return lever 53 and locking plate 50 back to their proper position in recharging or resetting the meter.

A latch 59 (Figs. 5, 6 and 11) is pivoted at its rear end within the casing and has a downwardly bent front end that rests upon the top of the end $57^a$ of the lever 57, when the meter is charged and ready for operation; but when the locking plate 50 locks the lower registering mechanism (thus permitting spring 55 to throw levers 53 and 57 into the position shown in Figs. 5 and 11) the front end of latch 59 drops down beside the part $57^a$ of lever 57 and prevents resetting of the parts 53, and 57 and 50, until door 36 is opened and lever 59 raised by hand and lever $57^a$ pushed back by hand.

Latch 59 may be depressed by a spring 63. Said latch is connected by a link 60 with an oscillating indicator 61 which underlies a sight opening $34^c$ in the top of case 34, and which indicator is marked to show that the meter is either "charged" or "discharged," the meter when "charged" being ready for replacement in the machine for further operation, and when "discharged" being locked so that it will not operate further until reset.

When latch 59 drops over the end $57^a$ of lever 57 the link 60 is depressed and rocks indicator 61 to "discharged" at the sight opening $34^c$.

*The inking mechanism.*

The printer 38 may be supplied with ink by any suitable means. I prefer to employ an inking pad or roller 123 (Fig. 1) which is mounted on a swingable bracket or arm 124 rigidly connected to the upper end of a shaft 23, Fig. 3, is suitably mounted in the frame at one side of the meter; so that the inking roller 123 can be turned from the position shown in full lines in Fig. 1, where it contacts with the printer 38, into the position shown in dotted lines in Fig. 1 where it would not contact with the printer. The inking roller may be held in operative position to contact with the printer 38 by means of a catch 125 having a tooth adapted to engage a notch in the end of the support 124 as indicated in Fig. 1, this latch being controlled by a suitable spring.

Fast to the shaft 23 is a cam 14 (Figs. 3 and 4) which cam is adapted to engage the trip-link 3 and move it out of position to be engaged by the arm 2 whenever the ink roller is swung out of position to contact with the printer, so that moving the inking roller out of contact with the printer 38 automatically renders the trip mechanism ineffective; and thus the machine is prevented from being run, without inking the printer when it is being used to postmark-stamp letters. Also if it is desired to run the machine merely to seal the letters without printing them the adjustment of the inking mechanism out of the way automatically, through the described devices, renders the trip mechanism and the printer inoperative.

Preferably the inking roller 123 is adjustably connected to the slide 124 by mounting the inking roller on a slide 127, which is fastened to the support 124 by a thumb screw 128. When the inking roller 5 is turned out of operative position, as indicated in dotted lines in Fig. 1, it may be adjusted into contact with a gage pin 25, which is so fixed in the machine that if the periphery of the inking roller is set up against this gage pin when the support 124 is in the position indicated in dotted lines in Fig. 1, then the periphery of the inking roller will properly exactly contact with the printing surfaces on the printer 38 and properly supply ink thereto when the inking mechanism is turned to operative position shown in full lines in Fig. 1.

*Auxiliary locking devices.*

To prevent the printer 38 being accidentally or purposely turned when the meter is charged but not on the machine; and to insure the alinement of the key $47^a$ with its mating slot $20^a$ in the clutch member 20 when replacing the meter in the machine; I provide auxiliary locking devices of any suitable kind. As shown (Figs. 5, 7, 8 and 11) a disk $40^b$ is securely fastened to the gear 40 of the printer spindle 37 and revolves with it. Said disk has a notch $40^c$ adapted to receive a lug $66^a$ on a latch 66 when the printer is at its "rest" position. Latch 66 is pivoted at 67 in the base and is guided by a pin 69, and said latch is normally urged to engage its lug $66^a$ with notch $40^c$ in disk $40^b$ by spring 68.

When the meter is in place in the machine a pin 17 (Figs. 3 and 4) securely fastened to part 26 enters the hole in the inner end of base 31 occupied by pin 69 Fig. 11, and displaces pin 69, moving it backward against the action of spring 68 and carrying with it the latch 66, thus disengaging lug $66^a$ from disk $40^b$. When the meter is removed from the machine the pin 69 resumes its place as shown in Fig. 11 and latch 66 engages notch $40^c$ and locks the printer in "rest" position.

Latch 66 could be tampered with when the meter is off the machine by pressing in the pin 69 thus releasing the printer, but then the printer could not be turned if latch plate 50 is in locked engagement with register L. Even if lock plate 50 was out of locking engagement with register L, if latch 66 was disengaged from disk 40[b] to release the printer with an intention to defraud, such intent is defeated by the fact that the registers being actuated by eccentrics the turning of the printer in either direction has the same effect on the registers; that is, one will be added to the count of the upper register and one subtracted from the lower register for each revolution of the printer in either direction. The latch 66 however is intended to keep the spindle 37 and its related key 47[a] in alinement with the groove in part 20 when the meter is removed from and replaced in the machine.

*Operations.*

It should be understood from the foregoing description that the meter (with the printer and the registering mechanism) is bodily detachable from the machine and bodily attachable to the machine at will and bearing this in mind the operation of the various mechanisms described and the utility thereof will be more readily appreciated.

Before the meter is put on the machine and no letters have been stamped thereby, the total registering mechanism T should be set to zero; the registering mechanism L should be set in accordance with the number of impressions or postmark-stamps which it is desired to have the machine apply to letters before the registering mechanisms shall be automatically locked. Then the meter can be placed in the machine and operated until the total number of impressions for which the register L was set have been made; these impressions may be made during one continued operation of the machine; or during any number of successive operations of the machine; but when the machine has made as many operations as the lower register L is initially set for, said lower registering mechanism will be automatically locked, and the meter can then be removed from the machine and register L reset, by a properly authorized person having charge of the keys by which access can be had to the registering devices, as above explained.

When it is desired to reset the meter after it has performed the number of operations for which the lower register L was set; the meter may be removed from the machine, or it may be reset while on the machine, as preferred; but ordinarily it is better to remove the meter for resetting it; and the resetting operation is as follows:—

To charge or set the meter.—Unlock and open lower door 36, raise latch 59 clear of lever 57, move lever 57 to the left as far as it will go; this will turn lever 53 through the medium of the link 56 and the end 52 of locking lever 53 will, by reason of the inclined surface 52[a], raise the finger 51 of locking plate 50 and lower its front end out of engagement with the disks 49. While lever 57 is held in this position the "ten thousand" or extreme left hand, numbering wheel of register L should be turned one division or until it shows the figure 9 so that the notch in its disk 49 will not be in position to register with the related tooth 50[a] on plate 50, and plate 50 will thereby be held disengaged from all the other disks 49. Lever 57 may then be released and the wheels in the numbering mechanism L turned to the desired setting, moving each wheel until the right numeral appears at the reading point, setting the "ten thousand" wheel last.

When the meter is thus charged the hole 54[a] in end of lever 53 will be in line with the hole 58 in the base 31 and will permit the entrance of the pin 8, when released by the action of the trip, thus permitting one revolution of the printer 38; and for each operation of the printer one number is subtracted from the number appearing at the reading point on the lower register L. This operation continues till the lower register reads 00000, at which moment the slots in all the disks 49 in the lower register L come into alinement and the locking plate 50 will engage them; and its finger 51 will move down in the slotted end 52 of lever 53 and engage the notch 52[b]; and lever 53 will swing over so that its end 54 closes hole 58; and lever 53 moves lever 57 with it, allowing latch 59 to drop, locking all the parts as described, and shifting indicator 62 so that "Discharged" is displayed at the sight opening 34[c].

The top register T is continuous in its action, and is not to be reset; and being in a different compartment of the case cannot be tampered with except by opening the top door 35. This top register shows the total number of imprints or operations of the printer regardless of the various settings of the lower register.

*Operation of the tripping devices.*

The letter or piece of mail matter passing through the machine is fed between the trip rollers 21 and 22 (See Fig. 3). At this point the head 1[a] of the trip finger 1 obstructs its passage and must be forced back to clear the way. This is accomplished by the roller 22 under action of its spring pressing the letter against the unyielding roller 21 and fence 16. The part 15[a] acts in a similar manner to roller 22 and serves to further support the end of the letter after it has left the "bite" of the two rollers 21 and 22.

When the trip finger 1 is thus forced to move it carries with it the arm 2 which in turn moves link 3 and it rocks part $4^b$ out of the path of the arm $5^a$.

Assuming all parts to be in operative position and condition, and the hole $54^a$ in lever 53 in register with the hole 58 in base 31, so that there is no obstruction to the projection of the pin 8 into the base 31. When part $5^a$ is released by the movement of part $4^b$ the triple lever turns on its stud $5^c$ sufficiently to cause arm $5^b$ to release the clutch member $11^a$ which causes clutch 11 to revolve with the spindle 30 which is continually in motion. During such revolution of clutch 11 cam $11^c$ engages the lower arm 5 of the triple lever and returns it to a position where its arm $5^b$ will again engage finger $11^a$ and stop lug $11^b$ and disengage the clutch and stop the rotation of the printer spindle 37 and connected parts.

The trip link 3 is disengaged from arm 2 by reason of its cam-shaped end $3^a$ contacting the guide 13 as soon as the link has caused arm $4^b$ to release arm $5^a$, and the spring 19 immediately returns link 3 to position shown in full lines in Fig. 3 without having to wait for the finger 1 to return after the passage of the letter. This insures the return of part $4^b$ in time and place to arrest arm $5^a$ and prevent a second revolution of the printer.

This completes the cycle of operations of the trip mechanism. Such operation may be repeated indefinitely once for and during the passage of each letter through the machine, until the lower register of the meter reads zero, when the lever 53 is automatically moved to close the opening 58 and prevent pin 8 entering socket $54^a$ and consequently preventing oscillation of part 5. Other parts of the trip are free to move, but will have no effect on the printer so long as pin 8 cannot enter socket $54^a$.

The machine shown in Figs. 1 and 2 is adapted to moisten and seal envelopes, separate them from a pile, pass them through the printing mechanism, place the desired impression thereupon, and discharge them sealed and printed ready for mailing, and keep track of the number of letters operated upon at any one operation of the machine, and any series of operations of the machine, but the sealing mechanism forms no part of the present invention.

To enable the machine to be used for post-mark-stamping mail requiring different amounts of postage, the machine may be provided with a set of interchangeable meters, as above described, (each meter comprising a case, a printer, and registering mechanisms constructed and adapted to operate as above described) but the printer in each case bearing a postmark-stamp die of a denomination different from those of the printers in the other meters. Thus one meter could be used for printing and registering 2¢ postage; another 3¢ postage; another 6¢ postage, and so on, according to the varieties of postage and the amount of postage required. As each machine and meter is designed to operate upon large numbers of letters of substantially the same size and requiring like postage, it is very easy to insert into the machine a meter of the desired denomination of postage; and when letters requiring a different amount of postage are to be run through the machine, such meter can be removed and another meter substituted therefor adapted to print the proper value of postage upon the letters.

In order to obviate the possibility of any of the mechanisms being jammed or injured in case the actuating mechanism contained in the meter fails to properly operate, I preferably arrange a friction clutch at a suitable point between the power mechanism and the roller clutch 11, preferably by connecting the gear $30^a$ to shaft 30 by means of a friction clutch, so that if there should be any binding or failure of the parts of the meter to work properly the friction clutch would slip and thus prevent injury to any of the other parts by reason of the positive action of the roller clutch.

What I claim is:

1. In a machine of the character specified, means for feeding letters past a printing point; a meter bodily removable from and replaceable in the machine adjacent the printing point, printing means adapted to be operated when the meter is in the machine; a trip mechanism adapted to be tripped by letters passing through the machine; and means controlled by the trip mechanism for operating the printing means each time a letter passes through the machine; with means for automatically locking the printing means when the meter is removed from the machine.

2. In a machine of the character specified in claim 1, means in the meter for automatically preventing the operation of the printing means when it has made a predetermined number of revolutions.

3. In mechanism as set forth in claim 1, a registering mechanism in the meter, means for operating the registering mechanism one point for each operation of the printing means, and means for locking the registering mechanism when the printing means has made a predetermined number of operations.

4. In a machine as set forth in claim 1, the meter carrying one of the printing members, substantially as and for the purpose specified.

5. In mechanism as specified in claim 1, a printer carrying spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

6. In mechanism as set forth in claim 1, a printer carrying spindle in the meter provided with a key projecting outside the meter casing; a continually driven shaft in the machine; a member adapted to be driven by said shaft, said member having a slot adapted to be engaged by the said key when the meter is positioned in the machine; and a clutch for connecting this member with the shaft when permitted by the trip mechanism.

7. In a machine as set forth in claim 1, means for inking the printer, and means whereby the trip mechanism is rendered ineffective if the inking means is not in operative position.

8. In a machine as set forth in claim 1, means for inking the printer, and means whereby the trip mechanism is rendered ineffective if the inking means is not in operative position, a printer carrying spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

9. In mechanism as set forth in claim 1, a registering mechanism in the meter, means for operating the registering mechanism one point for each operation of the printing means, and means for locking the registering mechanism when the printing means has made a predetermined number of operations, a printer carrying spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

10. In mechanism as set forth in claim 1, a registering mechanism in the meter, means for operating the registering mechanism one point for each operation of the printing means, and means for locking the registering mechanism when the printing means has made a predetermined number of operations, a second registering mechanism in the meter; and means for operating this second mechanism simultaneously with the first registering mechanism.

11. In mechanism as set forth in claim 1, a registering mechanism in the meter, means for operating the registering mechanism one point for each operation of the printing means, and means for locking the registering mechanism when the printing means has made a predetermined number of operations; a second registering mechanism in the meter; and means for operating this second mechanism simultaneously with the first registering mechanism; and means whereby access cannot be had to either registering mechanism except through a related opening in the meter casing.

12. In a machine of the character specified in claim 1, means in the meter for automatically preventing the operation of the printing means when it has made a predetermined number of revolutions; a printer carrying spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

13. In a machine of the character specified in claim 1, means in the meter for automatically preventing the operation of the printing means when it has made a predetermined number of revolutions; a printer carrying spindle in the meter provided with a key projecting outside the meter casing; a continually driven shaft in the machine; a member adapted to be driven by said shaft, said member having a slot adapted to be engaged by the said key when the meter is positioned in the machine; and a clutch for connecting this member with the shaft when permitted by the trip mechanism.

14. In a postmark-stamping machine having means for feeding letters past a printing point; and an impression member in the machine at the printing point; of a meter bodily removable from and replaceable in the machine adjacent the printing point, said meter carrying a printer adapted to cooperate with the impression member when the meter is in the machines; a trip mechanism adapted to be actuated by the letters passing through the machine; and means controlled by the trip mechanism for operating the printer once each time a letter passes through the machine; with means for locking the printer when the meter is removed from the machine.

15. In a postmark-stamping machine as set forth in claim 14, means in the meter for automatically preventing the operation of the printer when it has made a predetermined number of revolutions.

16. In a machine as set forth in claim 14, means for inking the printer, and means whereby the trip mechanism is rendered ineffective if the inking means is not in operative position.

17. In mechanism as set forth in claim 14, a registering mechanism in the meter, means for operating the registering mechanism one point for each operation of the printing means, and means for locking the registering mechanism when the printing means has made a predetermined number of operations.

18. In mechanism as specified in claim 14, a printer carrying spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

19. In mechanism as set forth in claim 14, a printer carrying spindle in the meter provided with a key projecting outside the meter casing; a continually driven shaft in the machine; a member adapted to be driven by said shaft, said member having a slot adapted to be engaged by the said key when the meter is positioned in the machine; and a clutch for connecting this member with the shaft when permitted by the trip mechanism.

20. In mechanism as set forth in claim 14, a registering mechanism in the meter, means for operating the registering mechanism one point for each operation of the printing means, and means for locking the registering mechanism when the printing means has made a predetermined number of operations; a second registering mechanism in the meter; and means for operating this second mechanism simultaneously with the first registering mechanism.

21. In mechanism as set forth in claim 14, a registering mechanism in the meter, means for operating the registering mechanism one point for each operation of the printing means, and means for locking the registering mechanism when the printing means has made a predetermined number of operations; a second registering mechanism in the meter; and means for operating this second mechanism simultaneously with the first registering mechanism, separate doors in the meter casing permitting access to the respective registering mechanisms, and means whereby access cannot be had to either registering mechanism except through its own door.

22. In a mail marking machine the combination of a printing member, numeral wheels; means for shifting said wheels one unit for each effective operation of the printing member; mechanism for directing mail matter past said member to receive impressions therefrom; said printing member being bodily removable from and replaceable in said machine; means adapted to prevent shifting of said wheels when said printing member is removed from the machine; and means whereby said wheels are automatically released when the printing member is replaced in operative position in the machine.

23. In a mail marking machine the combination of a printing member, a removable meter carrying numeral wheels; means for shifting said wheels one unit for each effective operation of the printing member when the meter is in the machine; mechanism for directing mail matter past said member to receive impressions therefrom; said printing member being bodily removable from and replaceable in said machine; means adapted to prevent shifting of said wheels when said meter is removed from the machine; and means whereby said wheels are automatically released when the meter is replaced in operative position in the machine.

24. In a mail marking machine the combination of an impression member; a printing member cooperating with said impression member; mechanism for directing mail matter between the impression and printing members to receive impressions, numeral wheels; and means for actuating said wheels from the printing member, said printing member and wheels being removable from and replaceable in operative position; means to prevent shifting of said wheels when they are removed from the machine; and means whereby said wheels are automatically released when replaced in operative position in the machine.

25. In a mail marking machine the combination of an impression member; a printing member cooperating with said impression member; mechanism for directing mail matter between the impression and printing members to receive impressions, a meter carrying numeral wheels, and means for actuating said wheels and said printing member, said meter and said printing member being removable from and replaceable in operative position; means to prevent shifting of said wheels when they are removed from the machine; and means whereby said wheels are automatically released when the meter is replaced in operative position in the machine.

26. In a mail marking machine the combination of a printing member; feeding mechanism for carrying mail matter past said member in position to receive impressions therefrom; numeral wheels operatively connected with said member, and removable with said member from and replaceable with said member in said machine; means adapted to prevent shifting of said numbering wheels when said member is removed from the machine; and means whereby the said wheels are automatically released when the member and wheels are replaced in operative position in the machine.

27. In a mail marking machine the combination of a printing member; feeding mechanism for carrying mail matter past said member in position to receive impressions therefrom; and numeral wheels operatively connected with said member, and removable with said member from operative position and replaceable with said member in operative position; means adapted to prevent shifting of said wheels when the member is removed from the machine; and means whereby said wheels are automatically released when they are replaced in operative position in the machine.

28. In a machine of the character specified, means for forwarding letters past the printing point; clutch controlled driving means for operating the printing means; and a trip mechanism adapted to be operated by a letter passing through the machine for releasing the clutch to permit the printing means to operate once for each letter passing through the machine; with a removable meter adapted to be placed in in the machine, means for automatically operatively engaging the printing means with the clutch controlled driving means as and when the meter is properly positioned in the machine; and means for automatically locking the printing means when the meter is removed from the machine.

29. In a machine as set forth in claim 28, means in the meter for automatically preventing the operation of the printing means when it has made a predetermined number of operations.

30. In mechanism as set forth in claim 28, a registering mechanism in the meter, means for operating the registering mechanism one point for each operation of the printing means; and means for locking the registering mechanism when the printing means has made a predetermined number of operations.

31. In a machine as set forth in claim 28, the meter carrying one of the printing members, substantially as and for the purpose specified.

32. In mechanism as specified in claim 28, a printer carrying spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

33. In a mechanism as set forth in claim 28, a printer carrying spindle in the meter provided with a key projecting outside the meter casing; a continually driven shaft in the machine; a member adapted to be driven by said shaft, said member having a slot adapted to be engaged by the said key, when the meter is positioned in the machine; and a clutch for connecting this member with the shaft when permitted by the trip mechanism.

34. In mechanism as set forth in claim 28, a registering mechanism in the meter, means for operating the registering mechanism one point for each operation of the printing means; a second registering mechanism in the meter; and means for operating this second mechanism simultaneously with the first registering mechanism.

35. In a machine as set forth in claim 28, means in the meter for automatically preventing the operation of the printing means when it has made a predetermined number of operations; a registering mechanism in the meter, means for operating the registering mechanism one point for each operation of the printing means; and means for locking the registering mechanism when the printing means has made a predetermined number of operations.

36. In a machine as set forth in claim 28, means in the meter for automatically preventing the operation of the printing means when it has made a predetermined number of operations; a registering mechanism in the meter, means for operating the registering mechanism one point for each operation of the printing means; and means for locking the registering mechanism when the printing means has made a predetermined number of operations; a second registering mechanism in the meter; and means for operating this second mechanism simultaneously with the first registering mechanism.

37. In mechanism as set forth in claim 28, a registering mechanism in the meter, means for operating the registering mechanism one point for each operation of the printing means; and means for locking the registering mechanism when the printing means has made a predetermined number of operations, a second registering mechanism in the meter; and means for operating this second mechanism simultaneously with the first registering mechanism.

38. In mechanism as set forth in claim 28, a registering mechanism in the meter, means for operating the registering mechanism one point for each operation of the printing means; and means for locking the registering mechanism when the printing means has made a predetermined number of operations; a second registering mechanism in the meter; and means for operating this second mechanism simultaneously with the first registering mechanism; the registering mechanism being only accessible through a related opening in the meter casing.

39. In mechanism as set forth in claim 28, a registering mechanism in the meter, means for operating the registering mechanism one point for each operation of the printing means; and means for locking the registering mechanism when the printing means has made a predetermined number of operations; a second registering mechanism in the meter casing; means for operating this second mechanism simultaneously with the first registering mechanism; separate doors in the meter casing permitting access to the respective registering mechanisms; and means whereby access cannot be had to either registering mechanism except through its own door.

40. In a machine as set forth in claim 28, means in the meter for automatically preventing the operation of the printing means when it has made a predetermined number of operations; a registering mechanism in the meter; means for operating the registering mechanism one point for each operation of the printing means; and means for locking the registering mechanism when the printing means has made a predetermined number of operations; a second registering mechanism in the meter; means for operating this second mechanism simultaneously with the first registering mechanism; and means whereby access cannot be had to the registering mechanism except through a related opening in the meter casing.

41. In a machine of the character specified, means for forwarding letters past the printing point; impression means at the printing point; a printer adapted to cooperate with the impression means; clutch controlled means for driving the printer; and a trip mechanism adapted to be operated by a letter passing through the machine for releasing the clutch to permit the printer to make one revolution for each letter passing through the machine; with a removable meter adapted to be placed in the machine adjacent the printing point, said meter carrying the printer; means for automatically operatively engaging the printer with the clutch controlled driving means as and when the meter is properly positioned in the machine; and means for automatically locking the printer when the meter is removed from the machine.

42. In a machine as set forth in claim 41, means in the meter for automatically preventing the operation of the printer when it has made a predetermined number of revolutions.

43. In mechanism as set forth in claim 41, a registering mechanism in the meter, means for operating the registering mechanism one point for each rotation of the printer, and means for locking the registering mechanism when the printer has made a predetermined number of operations.

44. In mechanisms as specified in claim 41, a printer carrying spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

45. In mechanism as set forth in claim 41, a printer carrying spindle in the meter provided with a key projecting outside the meter casing; a continually driven shaft in the machine; a member adapted to be driven by said shaft; said member having a slot adapted to be engaged by the said key when the meter is positioned in the machine; and a clutch for connecting this member with the shaft when permitted by the trip mechanism.

46. In a machine as set forth in claim 41, means in the meter for automatically preventing the operation of the printer when it has made a predetermined number of revolutions; registering mechanism in the meter, means for operating the registering mechanism one point for each rotation of the printer, and means for locking the registering mechanism when the printer has made a predetermined number of operations.

47. In mechanism as set forth in claim 41, a registering mechanism in the meter, means for operating the registering mechanism one point for each rotation of the printer, and means for locking the registering mechanism when the printer has made a predetermined number of operations; a second registering mechanism in the meter, and means for operating this second mechanism simultaneously with the first registering mechanism.

48. In mechanism as set forth in claim 41, a registering mechanism in the meter, means for operating the registering mechanism one point for each rotation of the printer, and means for locking the registering mechanism when the printer has made a predetermined number of operations; a second registering mechanism in the meter casing; means for operating this second mechanism simultaneously with the first registering mechanism; separate doors in the meter casing permitting access to the respective registering mechanisms, and means whereby access cannot be had to either registering mechanism except through its own door.

49. In a machine of the character specified, the combination of means for forwarding letters, a trip adapted to be engaged by a passing letter, a printer actuating member, a driven shaft, a clutch member for connecting the printer actuating member to the driven shaft, a lever adapted to hold the clutch member inactive, a stop adapted to hold said lever engaged with the clutch; a link connected with the stop; and means connected with the trip adapted to move the link and cause the stop to release the lever when the trip is moved by a letter.

50. In mechanism as set forth in claim 49, means for automatically disengaging the link from the trip to permit the stop to move to position to cause the lever to disengage the clutch member, and means to stop the printer when it has made one revolution.

51. In mechanism as set forth in claim 49, a cam carried by the clutch member adapted to engage said lever and return it to position to disengage the clutch and stop the rotation of the printer when the latter has made one revoluion.

52. In mechanism as set forth in claim 49, a vibrating member operatively connected with the lever; and a spring pressed pin engaged with said member; with a removable meter carrying mechanism for registering the number of operations of the printer; means in said meter for locking the registering mechanism, and devices in said meter whereby when the registering mechanism is locked and the meter is in the machine the said pin is arrested in such position that it will through its connections prevent said lever releasing the clutch.

53. In mechanism as set forth in claim 49, a link connected with the lever for holding the clutch member inactive; a swingable member connected with said link; and a spring pressed pin urging the member in one direction; with a meter carrying mechanism for registering the number of operations of the printer; devices in said meter for locking the registering mechanism, and devices in said meter whereby when the registering mechanism is locked the pin is arrested in such position that it will through its connections prevent said lever releasing the clutch.

54. In mechanism as specified in claim 49, a printer carrying spindle having a key; and a member having a slot adapted to be engaged by said key, said member being connected with the clutch member.

55. In mechanism as set forth in claim 49, means for inking the printer; a movable support for the inking means; and a device connected with said support whereby when the inker is moved out of operative position the trip link cannot be operated by the trip and the printer is prevented from operating.

56. In combination with mechanism as set forth in claim 49, means for inking the printer; a swingable support for the inking means; and a cam member connected with said support adapted when the inker has moved out of operative position to engage the trip link and hold it out of engagement with the trip arm, the clutch releasing mechanism being thereby rendered ineffective and the printer prevented from operating.

57. In mechanism as set forth in claim 49, means for automatically disengaging the link from the trip to permit the stop to move to position to cause the lever to disengage the clutch member, and a cam carried by the clutch member adapted to engage said lever and return it to position to disengage the clutch and stop the rotation of the printer when the latter has made one revolution.

58. In mechanism as set forth in claim 49, means for automatically disengaging the link from the trip to permit the stop to move to position to cause the lever to disengage the clutch member and stop the printer when the same has made one revolution; a vibrating member operatively connected with the lever; and a spring pressed pin engaged with said member; with a removable meter carrying mechanism for registering the number of operations of the printer; means in said meter for locking the registering mechanism, and devices in said meter whereby when the registering mechanism is locked and the meter is in the machine the said pin is arrested in such position that it will through its connections prevent said lever releasing the clutch.

59. In mechanism as set forth in claim 49, means for automatically disengaging the link from the trip to permit the stop to move to position to cause the lever to disengage the clutch member and stop the printer when the same has made one revolution; a link connected with the lever for holding the clutch member inactive; a swingable member, connected with said link; and a spring pressed pin urging the member in one direction; with a meter carrying the printer and mechanism for registering the number of operations of the printer; devices in said meter for locking the registering mechanism; and devices in said meter whereby when the registering mechanism is locked the pin is arrested in such position that it will through its connections prevent said lever releasing the clutch.

60. In mechanism as set forth in claim 49, means for automatically disengaging the link from the trip to permit the stop to move to position to cause the lever to disengage the clutch member and stop the printer when the same has made one revolution; a printer carrying spindle having a key; and a member having a slot adapted to be engaged by said key, said member being connected with the clutch member.

61. In mechanism as set forth in claim 49, means for automatically disengaging the link from the trip to permit the stop to move to position to cause the lever to disengage the clutch member and stop the printer when the same has made one revolution; means for inking the printer; a movable support for the inking means; and a device connected with said support whereby when the inker is moved out of operative position the trip link cannot be operated by the trip, and the printer is prevented from operating.

62. In mechanism as set forth in claim 49, means for automatically disengaging the link from the trip to permit the stop to move to position to cause the lever to disengage the clutch member and stop the printer when the same has made one revolution, means for inking the printer; a swingable support for the inking means; and a cam member connected with said support adapted when the inker has moved out of operative position to engage the trip link and hold it out of engagement with the trip arm, the clutch releasing mechanism being thereby rendered ineffective and the printer prevented from operating.

63. In mechanism as set forth in claim 49, a cam carried by the clutch member adapted to engage said lever and return it to position to disengage the clutch and stop the rotation of the printer when the latter has made one revolution, a vibrating member operatively connected with the lever; and a spring pressed pin engaged with said member; with a removable meter carrying mechanism for registering the number of operations of the printer; means in said meter for locking the registering mechanism and devices in said meter whereby when the registering mechanism is locked and the meter is in the machine the said pin is arrested in such position that it will through its connections prevent said lever releasing the clutch.

64. In mechanism as set forth in claim 49, a cam carried by the clutch member adapted to engage said lever and return it to position to disengage the clutch and stop the rotation of the printer when the latter has made one revolution, a link connected with the lever for holding the clutch member inactive; a swingable member connected with said link; and a spring pressed pin urging the member in one direction; with a meter carrying the printer and mechanism for registering the number of operations of the printer; devices in said meter for locking the registering mechanism, and devices in said meter whereby when the registering mechanism is locked the pin is arrested in such position that it will through its connections prevent said lever releasing the clutch.

65. In mechanism as set forth in claim 49, a cam carried by the clutch member adapted to engage said lever and return it to position to disengage the clutch and stop the rotation of the printer when the latter has made one revolution; a printer carrying spindle having a key; and a member having a slot adapted to be engaged by said key, said member being connected with the clutch member.

66. In mechanism as set forth in claim 49, a cam carried by the clutch member adapted to engage said lever and return it to position to disengage the clutch and stop the rotation of the printer when the latter has made one revolution; means for inking the printer; a movable support for the inking means; and a device connected with said support whereby when the inker is moved out of operative position the trip link cannot by operated by the trip and the printer is prevented from operating.

67. In mechanism as set forth in claim 49, a cam carried by the clutch member adapted to engage said lever and return it to position to disengage the clutch and stop the rotation of the printer when the latter has made on revolution, means for inking the printer; a swingable support for the inking means; and a cam member connected with said support adapted when the inker has moved out of operative position to engage the trip link and hold it out of engagement with the trip arm, the clutch releasing mechanism being thereby rendered ineffective and the printer prevented from operating.

68. In mechanism as set forth in claim 49, a vibrating member operatively connected with the lever; and a spring pressed pin engaged with said member; with a removable meter carrying mechanism for registering the number of operations of the printer; means in said meter for locking the registering mechanism, and devices in said meter whereby when the registering mechanism is locked and the meter is in the machine the said pin is arrested in such position that it will through its connections prevent said lever releasing the clutch; a second registering mechanism in the meter casing; and means for operating this second mechanism simultaneously with the first registering mechanism.

69. In mechanism as set forth in claim 49, a vibrating member operatively connected with the lever; and a spring pressed pin engaged with said member; with a removable meter carrying mechanism for registering the number of operations of the printer; means in said meter for locking the registering mechanism, and devices in said meter whereby when the registering mechanism is locked and the meter is in the machine the said pin is arrested in such position that it will through its connections prevent said lever releasing the clutch; a second registering mechanism in the meter casing; means for operating this second mechanism simultaneously with the first registering mechanism; and separate doors in the meter casing permitting access to the respective registering mechanisms, substantially as described.

70. In mechanism as set forth in claim 49, a link connected with the lever for holding the clutch member inactive; a swingable member connected with said link; and a spring pressed pin urging the member in one direction; with a meter carrying the printer and mechanism for registering the number of operations of the printer; devices in said meter for locking the registering mechanism, and devices in said meter whereby when the registering mechanism is locked the pin is arrested in such position that it will through its connections prevent said lever releasing the clutch; a second registering mechanism in the meter casing; and means for operating this second mechanism simultaneously with the first registering mechanism.

71. In mechanisms as set forth in claim 49, a vibrating member operatively connected with the lever; and a spring pressed pin engaged with said member; with a removable meter carrying mechanism for registering the number of operations of the printer; means in said meter for locking the registering mechanism, and devices in said meter whereby when the registering mechanism is locked and the meter is in the machine the said pin is arrested in such position that it will through its connections prevent said lever releasing the clutch; a second registering mechanism in the meter casing; means for operating this second mechanism simultaneously with the first registering mechanism; and separate doors in the meter casing permitting access to the respective registering mechanism, substantially as described.

72. In mechanism as set forth in claim 49, a vibrating member operatively connected with the lever; and a spring pressed pin engaged with said member; with a removable meter carrying mechanism for registering the number of operations of the printer; means in said meter for locking the registering mechanism, and devices in said meter whereby when the registering mechanism is locked and the meter is in the machine the said pin is arrested in such position that it will through its connections prevent said lever releasing the clutch; a second registering mechanism in the meter casing; means for operating this second mechanism simultaneously with the first registering mechanism; and separate doors in the meter casing permitting access to the respective registering mechanisms, and means whereby access cannot be had to either registering mechanism except through its own door.

73. In a machine of the character specified having printing means; means for directing letters past the printing means; devices whereby the printing means is permitted to make one operation each time a letter passes the printing point; and a removable meter; a registering mechanism in the meter, means for operating the registering mechanism one point for each operation of the printing means, means for locking the registering mechanism when the printing means has made a predetermined number of operations, and devices controlled by the register locking means whereby further operation of the printing means is prevented when the register is locked.

74. In a machine of the character specified, means for forwarding letters; a trip finger adapted to be engaged by a passing letter; a printer actuating member; a driven shaft; a clutch for connecting the printer actuating member to the driven shaft; a lever adapted to engage the clutch and stop the rotation of the printer; a stop adapted to engage said lever to hold the clutch disengaged; a trip link connected with the stop, and an arm connected with the trip finger adapted to engage trip link and cause the latter to move the stop arm and release the said lever when the trip finger is moved by a letter.

75. In mechanism as set forth in claim 74, means for automatically disengaging the trip link from the trip arm to permit the stop to move to the position to engage the lever and cause it to disengage the clutch and stop the printer when the same has made one revolution.

76. In mechanism as set forth in claim 74, a cam carried by the clutch adapted to engage an arm on said lever and return it to position to disengage the clutch and stop the rotation of the printer when it has made one revolution.

77. In mechanism as set forth in claim 74, a vibrating member operatively connected with the lever; and a spring pressed pin engaged with said member; with a removable meter carrying mechanism for registering the number of operations of the printer; means in said meter for locking the registering mechanism, and devices in said meter whereby when the rigistering mechanism is locked and the meter is in the machine the said pin is arrested in such position that it will through its connections prevent said lever releasing the clutch.

78. In mechanism as set forth in claim 74, a link connected with the clutch engaging lever; a swingable member, connected with said link; and a spring pressed pin urging the member in one direction; with a meter carrying the printer and mechanism for registering the number of operations of the printer; devices in said meter for locking the registering mechanism; and devices in said meter whereby when the registering mechanism is locked the pin is arrested in such position that it will through its connections prevent said lever releasing the clutch.

79. In mechanism as specified in claim 74, a printer carrying spindle having a key; and a member having a slot adapted to be engaged by said key, said member being connected with the clutch member.

80. In combination with mechanism as set forth in claim 74, means for inking the printer; a movable support for the inking means; and a device connected with said support whereby when the inker is moved out of operative position the trip link cannot be operated by the trip and the printer is prevented from operating.

81. In combination with mechanism as set forth in claim 74, means for inking the printer; a swingable support for the inking means; and a cam member connected with said support adapted when the inker has moved out of operative position to engage the trip link and hold it out of engagement with the trip arm, the clutch releasing mechanism being thereby rendered ineffective and the printer prevented from operating.

82. In mechanism as set forth in claim 74, means for automatically disengaging the trip link from the trip arm to permit the stop to move to the position to engage the lever and cause it to disengage the clutch and stop the printer when the same has made one revolution; a cam carried by the clutch adapted to engage an arm on said lever and return it to position to disengage the clutch and stop the rotation of the printer when it has made one revolution.

83. In mechanism as set forth in claim 74, means for automatically disengaging the trip link from the trip arm to permit the stop to move to the position to engage the lever and cause it to disengage the clutch and stop the printer when the same has made one revolution; a vibrating member operatively connected with the lever; and a spring pressed pin engaged with said member; with a removable meter carrying mechanism for registering the number of operations of the printer; means in said meter for locking the registering mechanism, and devices in said meter whereby when the registering mechanism is locked and the meter is in the machine the said pin is arrested in such position that it will through its connections prevent said lever releasing the clutch.

84. In mechanism as set forth in claim 74, means for automatically disengaging the trip link from the trip arm to permit the stop to move to the position to engage the lever and cause it to disengage the clutch and stop the printer when the same has made one revolution; a link connected with the clutch engaging lever; a swingable member, connected with said link; and a spring pressed pin urging the member in one direction; with a meter carrying the printer and mechanism for registering the number of operations of the printer; devices in said meter for locking the registering mechanism, and devices in said meter whereby when the registering mechanism is locked the pin is arrested in such position that it will through its connections prevent said lever releasing the clutch.

85. In mechanism as set forth in claim 74, means for automatically disengaging the trip link from the trip arm to permit the stop to move to position to engage the lever and cause it to disengage the clutch and stop the printer when the same has made one revolution; a printer carrying spindle having a key; and a member having a slot adapted to be engaged by said key, said member being connected with the clutch member.

86. In mechanism as set forth in claim 74, means for automatically disengaging the trip link from the trip arm to permit the stop to move to the position to engage the lever and cause it to disengage the clutch and stop the printer when the same has made one revolution; means for inking the printer; a movable support for the inking means; and a device connected with said support whereby when the inker is moved out of operative position the trip link cannot be operated by the trip and the printer is prevented from operating.

87. In mechanism as set forth in claim 74, means for automatically disengaging the trip link from the trip arm to permit the stop to move to the position to engage the lever and cause it to disengage the clutch and stop the printer when the same has made one revolution; means for inking the printer; a swinging support for the inking means; and a cam member connected with said support adapted when the inker has moved out of operative position to engage the trip link and hold it out of engagement with the trip arm; the clutch releasing mechanism being thereby rendered ineffective and the printer prevented from operating.

88. In mechanism as set forth in claim 74, a cam carried by the clutch adapted to engage an arm on said lever and return it to position to disengage the clutch and stop the rotation of the printer when it has made one revolution; a vibrating member operatively connected with the lever; and a spring pressed pin engaged with said member; with a removable meter carrying mechanism for registering the number of operations of the printer; means in said meter for locking the registering mechanism, and devices in said meter whereby when the registering mechanism is locked and the meter is in the machine the said pin is arrested in such position that it will through its connections prevent said lever releasing the clutch.

89. In mechanism as set forth in claim 74, a cam carried by the clutch adapted to engage an arm on said lever and return it to position to disengage the clutch and stop the rotation of the printer when it has made one revolution; a link connected with the clutch engaging lever; a swingable member, connected with said link; and a spring pressed pin urging the member in one direction; with a meter carrying the printer and mechanism for registering the number of operations of the printer; devices in said meter for locking the registering mechanism, and devices in said meter whereby when the registering mechanism is locked the pin is arrested in such position that it will through its connections prevent said lever releasing the clutch.

90. In mechanism as set forth in claim 74, a cam carried by the clutch adapted to engage an arm on said lever and return it to position to disengage the clutch and stop the rotation of the printer when it has made one revolution; a printer carrying spindle having a key; and a member having a slot adapted to be engaged by said key, said member being connected with the clutch member.

91. In mechanism as set forth in claim 74, a cam carried by the clutch adapted to engage an arm on said lever and return it to position to disengage the clutch and stop the rotation of the printer when it has made one revolution; means for inking the printer; a movable support for the inking means; and a device connected with said support whereby when the inker is moved out of operative position the trip link cannot be operated by the trip and the printer is prevented from operating.

92. In mechanism as set forth in claim 74, a cam carried by the clutch adapted to engage an arm on said lever and return it to position to disengage the clutch and stop the rotation of the printer when it has made one revolution; means for inking the printer; a swingable support for the inking means; and a cam member connected with said support adapted when the inker has moved out of operative position to engage the trip link and hold it out of engagement with the trip arm, the clutch releasing mechanism being thereby rendered ineffective and the printer prevented from operating.

93. In a machine of the character specified, a printer carrying spindle having a head provided with a key, a continually driven shaft; a member adapted to be driven by said shaft having a slot adapted to be engaged by the spindle key; and a clutch for connecting said member with the shaft.

94. In a mail marking machine the combination of a printing member, numeral wheels, means for operating said wheels, mechanism for directing mail matter past said member to receive impressions therefrom, said printing member and wheels being bodily removable from and replaceable in said machine, mechanism for locking said wheels when they register a predetermined amount; means adapted to prevent shifting of said wheels when removed from the machine; and means whereby the said wheels are automatically released when replaced in operative position in the machine.

95. In a mail marking machine the combination of a printing member, numeral wheels, means for operating said wheels, mechanism for directing mail matter past said member to receive impressions therefrom, said printing member and said wheels being bodily removable from and replaceable in said machine, mechanism for locking said wheels when they have reached a predetermined amount; means adapted to prevent shifting of said wheels when said printing member is removed from the machine; and means whereby the said wheels are automatically released when they are replaced in operative position in the machine.

96. In a mail marking machine the combination of an impression member; a printing member, numeral wheels, means for operating said wheels, mechanism for directing mail matter between the impression and printing members to receive impressions; said printing member and wheels being bodily removable from and replaceable in operative position; mechanism for locking said wheels when they have reached a predetermined amount; means for preventing unauthorized resetting of said wheels when they are removed from the machine; and means whereby the wheels are automatically released when they are replaced in operative position in the machine.

97. In a mail marking machine the combination of a printing member; feeding mechanism for carrying mail matter past said member in position to receive impressions therefrom; registering mechanism, means for operating said registering mechanism; a casing carrying said printing member and registering mechanism; said casing being bodily removable from and replaceable in said machine; means for preventing unauthorized resetting of said registering mechanism when removed from the machine; and means whereby the registering mechanism is automatically released when it is replaced in operative position in the machine.

98. In mechanism for the purpose specified, the combination of printing mechanism, numeral wheels; means for shifting the proper wheels at each printing operation of said printing member; means adapted to automatically lock said wheels against further operation after a predetermined number of impressions have been made, said wheels operating in a descending series until each numeral wheel in proper sequence shows zero; said printing mechanism and wheels being removable from and replaceable in said machine; means for preventing unauthorized resetting of said wheels when removed from the machine; and means whereby the numeral wheels are automatically released when they are replaced in operative position in the machine.

99. In mechanism for the purpose specified, the combination of a printing member; numeral wheels; means for shifting the proper wheel at each printing operation; means adapted to automatically lock said set of wheels against further operation after a predetermined number of impressions have been made, said wheels operating in a descending series; a second set of numeral wheels; means for operating the numeral wheels in the second set in an ascending series in proper sequence with the first numeral wheels; said set of wheels being removable from and replacable in said machine; means for preventing unauthorized resetting of said sets of numeral wheels when removed from the machine; and means whereby the numeral wheels are automatically released when they are replaced in operative position in the machine.

100. In a mail marking machine the combination of an impression member; a printing member cooperating with said impression member; mechanism for directing mail matter between the impression and printing members to receive impressions; a set of numeral wheels; means for operating said numeral wheels, said printing member and wheels being removable from the machine and replaceable therein; means to prevent shifting of said numeral wheels when removed from the machine; and means whereby the numeral wheels are automatically released when the printing member and wheels are replaced in operative position in the machine.

101. In a mail marking machine the combination of an impression member; a printing member cooperating with said impression member; mechanism for directing mail matter between the impression and printing members to receive impressions, a set of numeral wheels; means for operating said numeral wheels, said printing member and numeral wheels being removable from and replaceable in operative position; mechanism for locking said numeral wheels when they have reached a predetermined amount; means for preventing unauthorized resetting of said numeral wheels when they are removed from the machine; and means whereby the numeral wheels are automatically released when the printing member and wheels are replaced in operative position in the machine.

102. In a mail marking machine the combination of a printing member; feeding mechanism for carrying mail matter past said printing member in position to receive impressions therefrom; registering mechanism, means for operating said registering mechanism, a casing carrying said printing member and registering mechanism, said casing being removable from and replaceable in said machine and having a door and key controlled locking means for the door; with means for locking said registering mechanism, when removed from the machine with the casing; and means whereby the registering mechanism is automatically released when it is replaced in operative position in the machine.

103. In a machine of the character specified having means for feeding letters past a printing point; a continuously driven shaft; a printer driving member; clutch means for connecting said member to said shaft; means for arresting this member at each revolution thereof; a trip adapted to be actuated by letters passing through the machine; and means controlled by the trip for releasing the clutch and permitting the said member to rotate once for each letter passing through the machine; with a removable printer having a key on its spindle adapted to engage a corresponding slot in the said driving member when the meter is placed in the machine.

104. In a machine of the character specified having means for feeding letters past a printing point; a continuously driven shaft; a member adapted to be driven by said shaft and having a slot in its upper end; clutch means for connecting said member with said shaft; means for arresting this member after each revolution thereof; a trip adapted to be actuated by letters passing through the machine; and means controlled by the trip for releasing the clutch and permitting said member to rotate once for each letter passing through the machine; with a meter carrying a printer and registering mechanism, said printer having a key on its spindle adapted to engage the corresponding slot in said member when the meter is placed in the machine.

105. In a machine of the character specified, a printer, a notched disk on the printer, a latch adapted to engage the notch in said disk to lock the printer; a spring adapted to cause the latch to engage the notch; and a pin adapted to hold the latch out of engagement with the notch when the printer is in position in the machine.

106. In a machine of the character specified, a removable meter carrying a printer, a notched disk on the printer, a latch in the meter adapted to engage the notch in the disk to lock the printer; a spring adapted to cause the latch to engage the notch when the meter is removed from the machine; and a pin attached to the machine adapted to hold the latch out of engagement with the notch when the meter is in position in the machine.

107. In a machine of the character specified, a meter carrying a printer, a notched disk on the printer spindle, a latch pivoted in the meter and having a tooth adapted to engage the said notched disk and lock the printer; a pin engaging said latch, a spring adapted to project the pin and cause the latch to engage the notch when the meter is removed from the machine and a pin attached to the machine and adapted to enter the meter casing and engage the pin therein and hold the latch out of engagement with the notch when the meter is in position in the machine.

108. In a machine of the character specified, a meter, a registering mechanism therein having numeral wheels, and a member adapted to lock the numeral wheels and having a finger; a lever pivoted in the meter casing having a cam engaged by said finger; a printer; means for operating the numeral wheels one point for each operation of the printer; and means operated by said lever whereby when the registering mechanism has made a predetermined number of operations further operations of the printer are prevented; with a resetting lever connected with the cam lever and inclosed within the meter casing, said resetting lever being only accessible when the meter casing is opened.

109. In mechanism as set forth in claim 108, a locking lever in the casing adapted to engage the resetting lever when the locking member locks the numeral wheels, substantially as described.

110. In mechanism as set forth in claim 108, auxiliary means for locking the printer when the meter is removed from the machine, substantially as described.

111. In combination with mechanism as set forth in claim 108, an indicator within the meter casing and connections between the indicator and the numeral wheel locking means whereby the indicator is shifted and held in position to indicate either the charged or discharged condition of the registering mechanism.

112. In mechanism as set forth in claim 108, a locking lever in the casing adapted to engage the resetting lever when the locking member locks the numeral wheels; auxiliary means for locking the printer when the meter is removed from the machine, substantially as described, 113. In mechanism as set forth in claim 108, a locking lever in the casing adapted to engage the resetting lever when the locking member locks the numeral wheels; an indicator within the meter casing; and connections between the indicator and the numeral wheel locking means whereby the indicator is shifted and held in position to indicate either the charged or discharged condition of the registering mechanism.

114. In mechanism as set forth in claim 107, auxiliary means for locking the printer when the meter is removed from the machine; an indicator within the meter casing and connections between the indicator and the numeral wheel locking means whereby the indicator is shifted and held in position to indicate either the charged or discharged condition of the registering mechanism.

115. In a machine of the character specified, a meter, a registering mechanism therein having a series of numeral wheels and a notched disk connected with each wheel; a locking plate adapted to engage the notches in the disk when all of the numeral wheels are at zero and lock the registering mechanism, a lever pivoted in the meter casing provided with a cam slot, said locking plate having a finger adapted to engage said cam slot; a printer; means for operating the numeral wheels one point for each rotation of the printer; and means controlled with said lever whereby when the registering mechanism has made a predetermined number of operations further rotation of the printer is prevented; with a resetting lever connected with the cam lever and inclosed within the meter casing, said resetting lever being only accessible when the meter casing is opened.

116. In mechanism as set forth in claim 115, a locking lever in the casing adapted to engage the resetting lever when the locking plate locks the numeral wheels, substantially as described.

117. In mechanism as set forth in claim 115, auxiliary means for locking the printer when the meter is removed from the machine, substantially as described.

118. In combination with mechanism as set forth in claim 115, an indicator within the meter casing and connections between the indicator and the numeral wheel locking means whereby the indicator is shifted and held in position to indicate either the charged or discharged condition of the registering mechanism.

119. In mechanism as set forth in claim 115, a locking lever in the casing adapted to engage the resetting lever when the locking plate locks the numeral wheels; and auxiliary means for locking the printer when the meter is removed from the machine, substantially as described.

120. In mechanism as set forth in claim 115, a locking lever in the casing adapted to engage the resetting lever when the locking plate locks the numeral wheels; an indicator within the meter casing; and connections between the indicator and the numeral wheel locking means whereby the indicator is shifted and held in position to indicate either the charged or discharged condition of the registering mechanism.

121. In a machine of the character specified, means for feeding letters past a printing point; a meter bodily removable from and replaceable in the machine adjacent the printing point, printing means adapted to be operated when the meter is in the machine; a trip mechanism adapted to be tripped by letters passing through the machine; and means controlled by the trip mechanism for operating the printing means each time a letter passes through the machine; with a spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

122. In a machine as set forth in claim 121, the meter carrying one member of the printing means, substantially as specified.

123. In a postmark-stamping machine having means for feeding letters past a printing point; and an impression member in the machine at the printing point; a meter bodily removable from and replaceable in the machine adjacent the printing point; a printer adapted to cooperate with the impression member when the meter is in the machine; a trip mechanism adapted to be actuated by the letters passing through the machine; and means controlled by the trip mechanism for operating the printer once each time a letter passes through the machine; with a spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

124. In a machine as set forth in claim 123, the meter carrying the printer, substantially as and for the purpose specified.

125. In a machine of the character specified, means for forwarding letters past the printing point; clutch controlled driving means for operating the printing means; and a trip mechanism adapted to be operated by a letter passing through the machine for releasing the clutch to cause the printing means to operate once for each letter passing through the machine; with a removable meter adapted to be placed in the machine; a spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

126. In a machine of the character specified, means for forwarding letters past the printing point; impression means at the printing point; clutch controlled means for driving the printer; and a trip mechanism adapted to be operated by a letter passing through the machine for releasing the clutch to cause the printer to make one revolution for each letter passing through the machine; with a removable meter adapted to be placed in the machine adjacent the printing point; a spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

127. In a machine of the character specified having a printing means, and means for feeding letters past the printing means; a meter bodily removable from and replaceable in the machine adjacent the printing means, said meter carrying registering mechanism adapted to be operated when the meter is in the machine; a trip mechanism adapted to be tripped by letters passing through the machine; and means controlled by the trip mechanism for operating the printing means each time a letter passes through the machine; means for automatically preventing the operation of the printing means when the meter is removed from the machine; means for operating the registering mechanism one point for each operation of the printing means; and means whereby further printing operations are prevented when the registering mechanism has registered a predetermined number of operations.

128. In combination with mechanism as set forth in claim 127, a second registering mechanism in the meter; and means for operating this second mechanism simultaneously with the first registering mechanism.

129. In mechanism as set forth in claim 1, a registering mechanism in the meter, means for operating the registering mechanism one point for each operation of the printing means, and means whereby further printing operations are prevented when the registering mechanism has registered a predetermined number of operations; a second registering mechanism in the meter; and means for operating this second mechanism simultaneously with the first registering mechanism.

130. In mechanism as set forth in claim 14, a registering mechanism in the meter, means for operating the registering mechanism one point for each operation of the printing means, and means whereby further printing operations are prevented when the registering mechanism has registered a predetermined number of operations; a second registering mechanism in the meter; and means for operating this second mechanism simultaneously with the first registering mechanism.

131. In mechanism as set forth in claim 28, a registering mechanism in the meter, means for operating the registering mechanism one point for each operation of the printing means; and means whereby further printing operations are prevented when the registering mechanism has registered a predetermined number of operations.

132. In a machine as set forth in claim 28, means in the meter for automatically preventing the operation of the printing means when it has made a predetermined number of operations; a registering mechanism in the meter, means for operating the registering mechanism one point for each operation of the printing means; and means whereby further printing operations are prevented when the registering mechanism has registered a predetermined number of operations.

133. In a machine as set forth in claim 28, means in the meter for automatically preventing the operation of the printing means when it has made a predetermined number of operations; a registering mechanism in the meter, means for operating the registering mechanism one point for each operation of the printing means; and means whereby further printing operations are prevented when the registering mechanism has registered a predetermined number of operations; a second registering mechanism in the meter; and means for operating this second mechanism simultaneously with the first registering mechanism.

134. In mechanism as set forth in claim 28, a registering mechanism in the meter, means for operating the registering mechanism one point for each operation of the printing means; and means whereby further printing operations are prevented when the registering mechanism has registered a predetermined number of operations; a second registering mechanism in the meter; and means for operating this second mechanism simultaneously with the first registering mechanism.

135. In mechanism as set forth in claim 41, a registering mechanism in the meter, means for operating the registering mechanism one point for each rotation of the printer; and means whereby further printing operations are prevented when the registering mechanism has registered a predetermined number of operations.

136. In a machine as set forth in claim 41, means in the meter for automatically preventing the operation of the printer when it has made a predetermined number of revolutions; registering mechanism in the meter; means for operating the registering mechanism one point for each rotation of the printer; and means whereby further printing operations are prevented when the registering mechanism has registered a predetermined number of operations.

137. In mechanism as set forth in claim 41, a registering mechanism in the meter, means for operating the registering mechanism one point for each rotation of the printer; and means whereby further printing operations are prevented when the registering mechanism has registered a predetermined number of operations; a second registering mechanism in the meter; and means for operating this second mechanism simultaneously with the first registering mechanism.

138. In a machine of the character specified, having printing means; means for directing letters past the printing means; and a removable meter; means for automatically preventing the operation of the printing means when it has made a predetermined number of operations; a registering mechanism in the meter; means for operating the registering mechanism one point for each operation of the printing means; and means whereby further printing operations are automatically prevented when the registering mechanism has registered a predetermined number of operations; a second registering mechanism in the meter; and means for operating this second mechanism simultaneously with the first registering mechanism.

139. In a machine of the character specified, having printing means; means for directing letters past the printing means; and a removable meter; a registering mechanism in the meter; means for operating the registering mechanism one point for each operation of the printing means; and means whereby further printing operations are automatically prevented when the registering mechanism has registered a predetermined number of operations; a second registering mechanism in the meter; and means for operating this second mechanism simultaneously with and by the mechanism for operating the first registering mechanism.

140. In a machine of the character specified, having printing means; means for directing letters past the printing means; and a removable meter; a registering mechanism in the meter; means for operating the registering mechanism one point for each rotation of the printer; and means controlled by the registering mechanism whereby further printing operations are automatically prevented when the registering mechanism has registered a predetermined number of operations.

141. In a machine of the character specified, having printing means; means for directing letters past the printing means; and a removable meter; means in the meter for automatically preventing the operation of the printer when it has made a predetermined number of revolutions; registering mechanism in the meter; means for operating the registering mechanism one point for each rotation of the printer; and means controlled by the registering mechanism whereby further printing operations are automatically prevented when the registering mechanism has registered a predetermined number of operations.

142. In a machine of the character specified, having printing means; means for directing letters past the printing means; and a removable meter; a registering mechanism in the meter; means for operating the registering mechanism one point for each rotation of the printer; means whereby further printing operations are automatically prevented when the registering mechanism has registered a predetermined number of operations; a second registering mechanism in the meter; and means for operating this second mechanism simultaneously with the first registering mechanism.

143. In a machine of the character specified having printing means; means for directing letters past the printing means; devices whereby the printing means is permitted to make one operation each time a letter passes the printing point; and a removable meter; a registering mechanism in the meter, means for operating the registering mechanism one point for each operation of the printing means, means for locking the registering mechanism when the printing means has made a predetermined number of operations, and devices controlled by the register locking means whereby further operation of the printing means is prevented when the register is locked; a second registering mechanism in the meter; and means for operating this second mechanism simultaneously with and by the mechanism for operating the first registering mechanism, substantially as described.

144. In a machine of the character specified having printing means; means for directing letters past the printing means; devices whereby the printing means is permitted to make one operation each time a letter passes the printing point; and a removable meter; means for inking the printer, and means whereby the mechanism is rendered ineffective if the inking means is not in operative position.

145. In a machine of the character specified having printing means; trip mechanism controlling the operation of said printing means; means for directing letters past the printing means; devices whereby the printing means is permitted to make one operation each time a letter passes the printing point; and a removable meter; means for inking the printer; and means whereby the trip mechanism is rendered ineffective if the inking means is not in operative position; a printer carrying spindle in the meter provided with a part projecting outside the meter casing; a continually driven shaft; a member adapted to be engaged by said part when the meter is positioned in the machine; and clutch means for connecting such member with the continuously driven shaft when permitted by the trip mechanism.

146. In a machine of the character specified having printing means; means for directing letters past the printing means; devices whereby the printing means is permitted to make one operation each time a letter passes the printing point; and a removable meter; a registering mechanism in the meter, means for operating the registering mechanism one point for each operation of the printing means, and means for locking the registering mechanism when the printing means has made a predetermined number of operations; a second registering mechanism in the meter; and means for operating this second mechanism simultaneously with and by the mechanism for operating the first registering mechanism, substantially as described.

In testimony that I claim the foregoing as my own, I affix my signature.

ARTHUR H. PITNEY.